J. B. STILLSON.
Fire-Extinguishers.
No. 139,275.  Patented May 27, 1873.
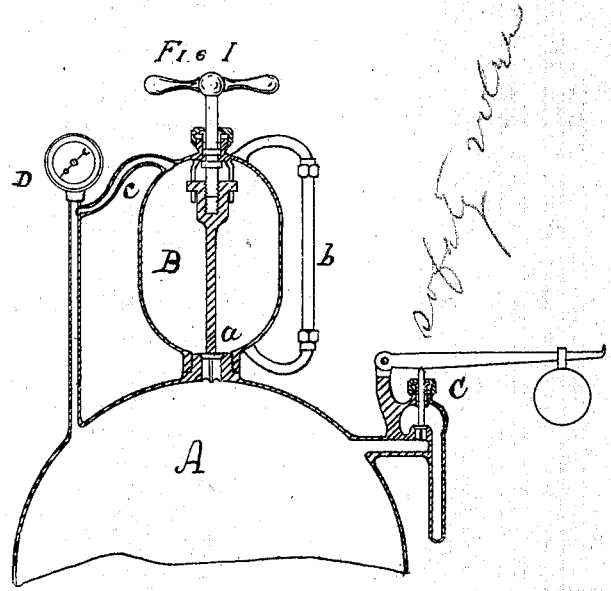
Fig. I
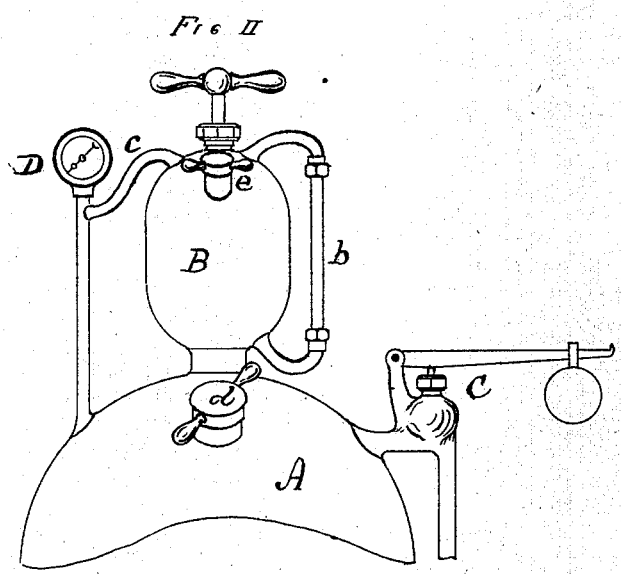
Fig. II

UNITED STATES PATENT OFFICE.

JEROME B. STILLSON, OF CHICAGO, ILLINOIS.

IMPROVEMENT IN FIRE-EXTINGUISHERS.

Specification forming part of Letters Patent No. 139,275, dated May 27, 1873; application filed October 5, 1872.

*To all whom it may concern:*

Be it known that I, JEROME B. STILLSON, of the city of Chicago, in the county of Cook and State of Illinois, have invented a certain new and useful Improvement in Fire-Extinguishers, of which the following is a full description, reference being had to the accompanying drawings making a part of this specification, in which—

Figure 1 is a vertical section, and Fig. 2 an elevation.

Fire-extinguishers and chemical fire-engines have heretofore been so constructed that the acid-receptacle holds only a single charge of acid; when this has been used it is difficult, in the hurry and confusion of a fire, and especially in the night, to refill the acid-receptacle without spilling the acid. The object of my invention is to overcome this difficulty, which I accomplish by providing an acid-receptacle large enough to contain several charges, and having a gage connected therewith.

In the drawings, A represents the receptacle which contains the alkaline solution; B, the acid-receptacle, capable of holding two or more charges. I usually place it outside of the receptacle, in order to increase the capacity of the latter. B is properly connected to A and communicates therewith, and is provided with a suitable valve, $a$, which is operated from the outside, in the usual manner.

$b$ is a gage connected with the receptacle B for the purpose of indicating the quantity of acid therein, and the gage is to be graduated so as to indicate the number of charges in B. D is a pressure-gage; $c$, equalizing-pipe communicating with A and B; and C, safety-valve, constructed in the usual manner. The receptacles A and B are each provided with openings for filling the same, protected by suitable covers, shown in the drawings at $d$ and $e$.

In use, A is filled with an alkali solution, in the usual manner, while B contains two, three, or more charges of acid. By raising the valve $a$ the acid flows from B to A, and the operator, by watching the gage $b$, can tell when the quantity required for a single charge has escaped from B, and will then close the valve $a$.

$b$ is, of course, made of glass, properly protected; or it may be placed directly inside of the receptacle B.

What I claim as new is as follows:

The acid-receptacle B, when provided with a valve, $a$, and gage $b$, in combination with the alkali-receptacle A, all constructed substantially as and for the purpose specified.

JEROME B. STILLSON.

Witnesses:
E. A. WEST,
O. W. BOND.